United States Patent
Alexander et al.

(10) Patent No.: US 8,239,347 B2
(45) Date of Patent: *Aug. 7, 2012

(54) SYSTEM AND METHOD FOR CUSTOMIZING THE STORAGE AND MANAGEMENT OF DEVICE DATA IN A NETWORKED ENVIRONMENT

(75) Inventors: Bruce Alexander, Poulsbo, WA (US); David Antal, Silverdale, WA (US)

(73) Assignee: Vigilos, LLC, Tyler, TX (US)

( * ) Notice: Subject to any disclaimer, the term of this patent is extended or adjusted under 35 U.S.C. 154(b) by 265 days.

This patent is subject to a terminal disclaimer.

(21) Appl. No.: 12/557,341

(22) Filed: Sep. 10, 2009

(65) Prior Publication Data

US 2009/0327366 A1    Dec. 31, 2009

Related U.S. Application Data

(63) Continuation of application No. 10/377,866, filed on Feb. 28, 2003, now Pat. No. 7,606,843.

(60) Provisional application No. 60/361,886, filed on Mar. 4, 2002.

(51) Int. Cl.
*G06F 17/30* (2006.01)
(52) U.S. Cl. .......................... 707/661; 707/693; 707/694
(58) Field of Classification Search .................. 707/661, 707/693, 694; 709/224; 726/23, 25, 3, 5, 726/6, 7, 12; 713/151, 169
See application file for complete search history.

(56) References Cited

U.S. PATENT DOCUMENTS

| | | | |
|---|---|---|---|
| 4,216,375 A | 8/1980 | Ulch |
| 4,218,690 A | 8/1980 | Ulch |
| 4,581,634 A | 4/1986 | Williams |
| 4,714,995 A | 12/1987 | Materna |
| 4,721,954 A | 1/1988 | Mauch |
| 4,816,658 A | 3/1989 | Khandwala |
| 4,837,568 A | 6/1989 | Snaper |
| 4,839,640 A | 6/1989 | Ozer |
| 4,962,473 A | 10/1990 | Crain |
| 4,998,279 A | 3/1991 | Weiss |
| 5,097,505 A | 3/1992 | Weiss |
| 5,210,873 A | 5/1993 | Gay |
| 5,367,624 A | 11/1994 | Cooper |

(Continued)

FOREIGN PATENT DOCUMENTS

EP    0804031 A2    10/1997

(Continued)

OTHER PUBLICATIONS

"Axis 200+ Web Camera," Axis Communications brochure NE001/US/R2:15924, 1998, 2 pages.

(Continued)

*Primary Examiner* — Jean M Corrielus
(74) *Attorney, Agent, or Firm* — Andrews Kurth LLP

(57) ABSTRACT

A system and method for customizing the storage of data according to data attributes are provided. A user is provided with a graphical user interface for generating data archive profiles. The data archive profiles can include information regarding the attributes of the device data, specifications regarding the storage of the archived data, specifications regarding the retrieval of the archived data, and management of the archived data during storage. The execution of the data archive profiles facilitates the individual processing of specific data types or individual pieces of identifiable data.

20 Claims, 10 Drawing Sheets

U.S. PATENT DOCUMENTS

| | | | |
|---|---|---|---|
| 5,475,375 | A | 12/1995 | Barrett |
| 5,475,378 | A | 12/1995 | Kaarsoo |
| 5,506,986 | A | 4/1996 | Healy |
| 5,544,062 | A | 8/1996 | Johnston, Jr. |
| RE35,336 | E | 9/1996 | Ulch |
| 5,600,368 | A | 2/1997 | Matthews, III |
| 5,614,890 | A | 3/1997 | Fox |
| 5,629,981 | A | 5/1997 | Nerlikar |
| 5,654,696 | A | 8/1997 | Barrett |
| 5,664,186 | A | 9/1997 | Bennett |
| 5,678,039 | A | 10/1997 | Hinks |
| 5,680,328 | A | 10/1997 | Skorupski |
| 5,682,142 | A | 10/1997 | Loosmore |
| 5,729,471 | A | 3/1998 | Jain |
| 5,742,286 | A | 4/1998 | Kung |
| 5,768,119 | A | 6/1998 | Havekost |
| 5,771,354 | A | 6/1998 | Crawford |
| 5,813,009 | A | 9/1998 | Johnson |
| 5,870,733 | A | 2/1999 | Bass |
| 5,903,455 | A | 5/1999 | Sharpe, Jr. |
| 5,905,436 | A | 5/1999 | Dwight |
| 5,923,264 | A | 7/1999 | Lavelle |
| 5,937,415 | A | 8/1999 | Sheffield |
| 5,960,174 | A | 9/1999 | Dew |
| 6,009,526 | A | 12/1999 | Choi |
| 6,011,901 | A | 1/2000 | Kirsten |
| 6,023,223 | A | 2/2000 | Baxter, Jr. |
| 6,064,723 | A | 5/2000 | Cohn |
| 6,226,031 | B1 | 5/2001 | Barraclough |
| 6,233,588 | B1 | 5/2001 | Marchoili |
| 6,279,113 | B1 * | 8/2001 | Vaidya ............................ 726/23 |
| 6,321,338 | B1 * | 11/2001 | Porras et al. ..................... 726/25 |
| 6,356,949 | B1 | 3/2002 | Katsandres |
| 6,453,345 | B2 * | 9/2002 | Trcka et al. ................... 709/224 |
| 6,678,265 | B1 | 1/2004 | Kung |
| 6,698,021 | B1 | 2/2004 | Amini |
| 6,826,173 | B1 | 11/2004 | Kung |
| 6,850,252 | B1 | 2/2005 | Hoffberg |
| 6,917,902 | B2 | 7/2005 | Alexander |
| 6,963,937 | B1 * | 11/2005 | Kamper et al. ................. 710/73 |
| 7,002,481 | B1 | 2/2006 | Crane |
| 7,020,532 | B2 | 3/2006 | Johnson |
| 7,055,101 | B2 | 5/2006 | Abbott |
| 7,076,737 | B2 | 7/2006 | Abbott |
| 7,480,715 | B1 * | 1/2009 | Barker et al. ................. 709/224 |
| 7,606,843 | B2 * | 10/2009 | Alexander et al. ..................... 1/1 |
| 7,966,078 | B2 * | 6/2011 | Hoffberg et al. ................ 700/17 |
| 7,987,003 | B2 * | 7/2011 | Hoffberg et al. ................ 700/17 |
| 2002/0004390 | A1 | 1/2002 | Cutaia |
| 2002/0019945 | A1 | 2/2002 | Houston |
| 2002/0029263 | A1 | 3/2002 | Toyoshima |
| 2003/0025599 | A1 | 2/2003 | Monroe |
| 2003/0167153 | A1 | 9/2003 | Alexander |
| 2005/0190180 | A1 * | 9/2005 | Jin et al. ....................... 345/419 |

FOREIGN PATENT DOCUMENTS

| | | |
|---|---|---|
| WO | 97/07486 A1 | 2/1997 |
| WO | 01/28251 A1 | 4/2001 |

OTHER PUBLICATIONS

"Axis 240 Camera Server," Axis Communications brochure NE002/US/R1:15925, 1998, 2 pages.

"EyeCast Announces EyeCapture Services," EyeCast.com Press Release, Jul. 8, 1998, Sterling, Virginia, <www.eyecast.com/news/releases/070898.asp> [retrieved Sep. 27, 1999], pp. 1-2.

"EyeCast Secures Deals: Security Companies to Use Firm's Off-Site Video Surveillance Technology," Washington Business Journal, Aug. 13-19, 1999, Tech Section, p. 16, <www.eyecast.com/news/washbiz.asp> [retrieved Sep. 21, 1999], 2 pages.

"EyeCast.com Adds 360-Degree Continuous Pan Rotation Cameras to It's [sic] EyeView Service," EyeCast.com Press Release, Mar. 15, 1999, Sterling, Virginia, www.eyecast.com/news/releases/031599.asp [retrieved Sep. 21, 1999], pp. 1-2.

"EyeCast.com Announces EyeView Control," EyeCast.com Press Release, Oct. 12, 1998, Sterling, Virginia, <www.eyecast.com/news/releases/101298.asp> [retrieved Sep. 24, 1999], pp. 1-2.

"EyeCast.com Introduces SchoolCast Services for School Safety Officials and Law Enforcement Agencies," EyeCast.com Press Release, Apr. 28, 1999, Sterling, Virginia, <www.eyecast.com/news/releases/090798.asp> [retrieved May 18, 2000], pp. 1-2.

"EyeCast.com, Inc.: Providing Live Interactive Video for Surveillance & Monitoring Over the Internet," slide presentation, as early as Dec. 26, 2001, 27 pages.

"Network Camera Servers: AXIS 240 Camera Server," Axis Communications, Sep. 23, 1999, <www.axis.se/products/cam_240/> [retrieved Sep. 28, 1999], 2 pages.

"Network Camera Servers: Features & Benefits," Axis Communications, Apr. 17, 1998, <www.axis.se/products/camera_servers/cam_fb.html> [retrieved Sep. 28, 1999], 3 pages.

"Take a Step Into the Future . . . DISS, The Digital Security System," www.remotecams.com, <www.remotecams.com/DISSpage1a.htm; /DISSpage2a.htm; /DISSconfiguration.htm; and /DISSsystem.htm> [retrieved Sep. 17, 1999], 7 pages.

"White Papers: Network Cameras Applications and Solutions," Axis Communications, Apr. 17, 1998, <www.axis.se/products/camera_servers/cam_app_sol.htm> [retrieved Sep. 28, 1999], 8 pages.

* cited by examiner

SYSTEM AND METHOD FOR CUSTOMIZING THE STORAGE AND MANAGEMENT OF DEVICE DATA IN A NETWORKED ENVIRONMENT

CROSS-REFERENCES TO RELATED APPLICATIONS

This application is a continuation of application Ser. No. 10/377,866, filed Feb. 28, 2003, which claims the benefit of U.S. Provisional Application No. 60/361,886, filed Mar. 4, 2002, the disclosures of which are incorporated by reference herein.

BACKGROUND

Generally described, many entities such as large corporations, can utilize computer systems, computer networks, and integrated devices that generate vast amounts of electronic data. In some situations, data can be generated, processed, and discarded after its intended purpose. In other situations, data needs to be maintained for a number of possible uses, generally referred to as archival. Accordingly, many data-producing entities look for storage solutions appropriate to the type and amount of data being archived.

Current storage solutions can include direct access storage ("DAS"), network access storage ("NAS"), and storage area networks ("SAN"). DAS refers to storage devices, such as magnetic media and optical media that are directly attached to a computing device generating the data to be archived. NAS refers to a network implementation in which special-purpose file management server-computing devices function as a storage destination for a number of computing devices located across a local area network ("LAN"). SAN refers to multiple file management servers functioning, as a storage location for a number of networked computing devices. In a SAN implementation, archived data may be spread out over a number of file servers, which may be physically remote from one another.

Generally described, file management systems govern the movement of data to and from storage devices from computing devices generating and/or requesting data. More specifically, a file management system is an organizational structure utilized to order and track the movement of data files. Most operating environments provide built-in file management systems that can be configured to work with DAS, NAS, and SAN. The typical operating system-provided file management system is operable to perform a range of archival processes such as identifying, extracting, compressing, encrypting, transmitting, receiving, decrypting, decompressing, archiving, and retrieving data. However, the benefit and utility of the typical operating system provided file management system can be constrained by an inability to differentiate between different data types. Further, a typical operating system file management system does not provide a manner to customize data storage based upon device data attributes.

In addition to operating system-provided file management systems, some archival processing systems utilize storage management software systems at the application layer to interact with the operating system provided file management system. Generally described, storage management software solutions provide central management of data storage and retrieval through a user interface, such as a graphical user interface ("GUI"). For example, some storage management software may create a "virtual repository" in which a storage management software application represents data dispersed over several storage media as a single "virtual" repository. Another storage management system may provide an Internet based software interface in which users may access and retrieve data from distributed sources. Although storage management systems facilitate data archival, the typical system may be limited in its ability to selectively archive data. For example, most typical software storage management systems are limited in their ability to distinguish data, such as multi-media data, from a variety of devices. Additionally, most typical software storage management solutions lack the ability to archive data according to specific device attributes.

Thus, there is a need for a system and method for managing the storage and archival of device data, including multi-media data, according to device data attributes.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A system and method for customizing the storage of data according to data attributes are provided. A user is provided with a graphical user interface for generating data archive profiles. The data archive profiles can include information regarding the attributes of the device data, specifications regarding the storage of the data, specifications regarding the retrieval of the archived data, and management of the archived data during storage. The execution of the data archive profiles facilitates the individual processing of specific data types or individual pieces of identifiable data.

In accordance with an aspect of the present invention, a method for processing monitoring device data is provided. The method may be implemented in a system including monitoring devices generating monitoring device data, an archive server processing the archival of monitoring device data, and a client computer configuring the archival of monitoring device data. In accordance with the method, a monitoring device data processor obtains incoming monitoring device data. The monitoring device data is characterized by one or more archival attributes. The monitoring device data processor obtains an archival profile associated with the one or more archival attributes of the incoming monitoring device data. The monitoring device data processor processes the incoming monitoring device data according to the archival profile. The monitoring device data processor also generates an archival activity corresponding to the processing of the archival profile.

In accordance with another aspect of the present invention, a system for processing monitoring device data is provided. The system includes one or more monitoring devices generating monitoring device data characterized by one or more data archival attributes. The system also includes a monitoring device data processor for obtaining an archival profile corresponding to the one or more data archival attributes and for processing the monitoring device data according to the archival profile. The system further includes at least one data repository for storing the monitoring device data according to the archival profile.

In accordance with a further aspect of the present invention, a method for processing monitoring device data is provided. The method may be implemented in an system including monitoring devices generating monitoring device data, an archive server processing the archival of monitoring device data, and a client computer configuring the archival of monitoring device data. In accordance with the method, a processing system generates a display corresponding to the creation of an archival profile and obtains a user specification of at least one archival attribute and archival activity to be included in the archival profile. The processing system stores the archival profile.

The processing system obtains incoming monitoring device data. The monitoring device data is characterized by one or more archival attributes. The processing system obtains an archival profile associated with the one or more archival attributes of the incoming monitoring device data. The processing system processes the incoming monitoring device data according to the archival profile. The processing system also generates an archival activity corresponding to the processing of the archival profile.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
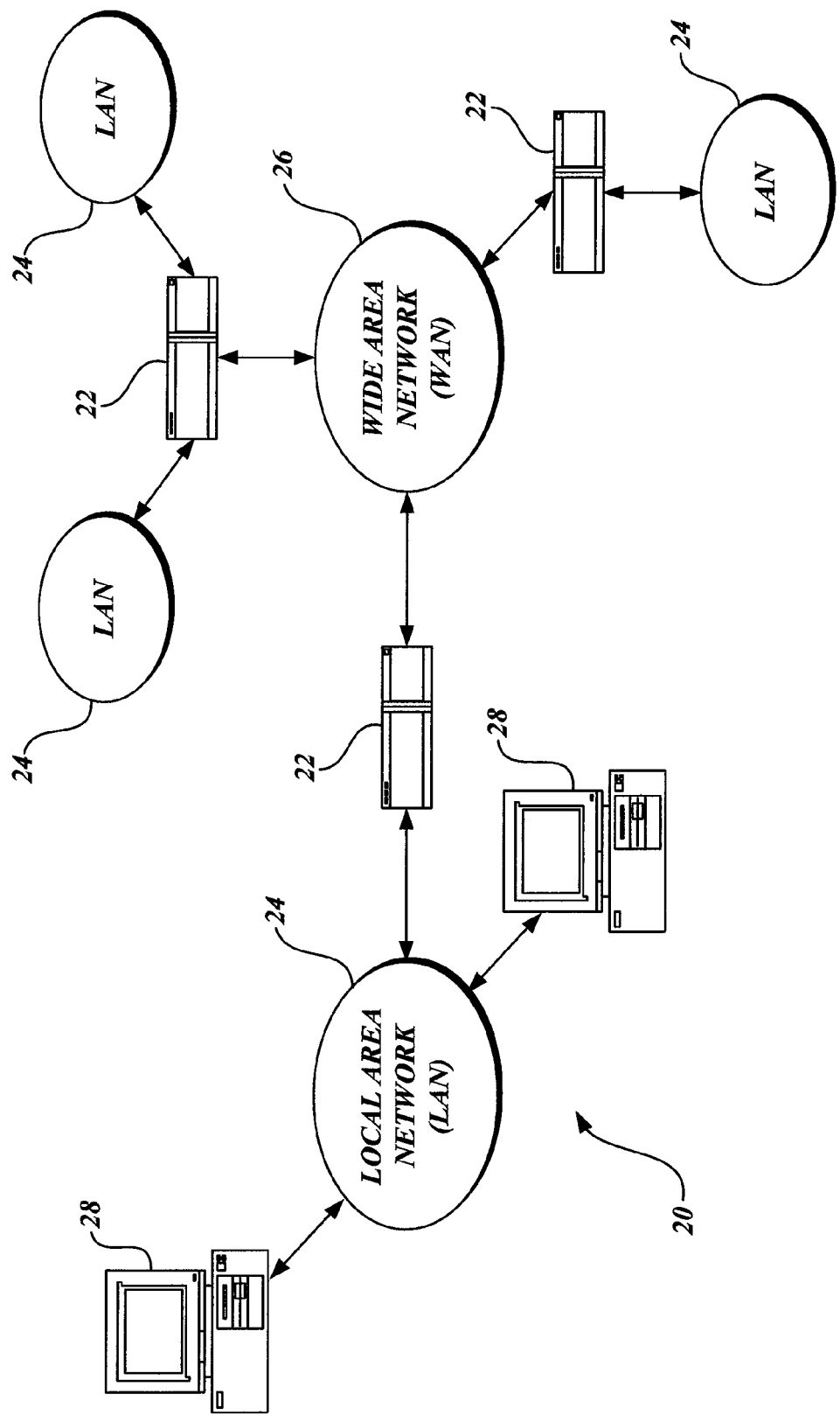
FIG. 1 is a block diagram of a representative portion of the Internet.

As described above, aspects of the present invention are embodied in a World Wide Web ("WWW") or ("Web") site accessible via the Internet. As is well known to those skilled in the art, the term "Internet" refers to the collection of networks and routers that use the Transmission Control Protocol/Internet Protocol ("TCP/IP") to communicate with one another. A representative section of the Internet 20 is shown in FIG. 1, where a plurality of local area networks ("LANs") 24 and a wide area network ("WAN") 26 are interconnected by routers 22. The routers 22 are special purpose computers used to interface one LAN or WAN to another. Communication links within the LANs may be wireless, twisted wire pair, coaxial cable, or optical fiber, while communication links between networks may utilize 56 Kbps analog telephone lines, 1 Mbps digital T-1 lines, 45 Mbps T-3 lines or other communications links known to those skilled in the art.

Furthermore, computers 28 and other related electronic devices can be remotely connected to either the LANs 24 or the WAN 26 via a digital communications device, modem and temporary telephone, or a wireless link. It will be appreciated that the Internet 20 comprises a vast number of such interconnected networks, computers, and routers and that only a small, representative section of the Internet 20 is shown in FIG. 1.

The Internet has recently seen explosive growth by virtue of its ability to link computers located throughout the world. As the Internet has grown, so has the WWW. As is appreciated by those skilled in the art, the WWW is a vast collection of interconnected or "hypertext" documents written in HyperText Markup Language ("HTML"), or other markup languages, that are electronically stored at or dynamically generated by "WWW sites" or "Web sites" throughout the Internet. Additionally, client-side software programs that communicate over the Web using the TCP/IP protocol are part of the WWW, such as JAVA® applets, instant messaging, e-mail, browser plug-ins, Macromedia Flash, chat, and others. Other interactive hypertext environments may include proprietary environments such as those provided in America Online or other online service providers, as well as the "wireless Web" provided by various wireless networking providers, especially those in the cellular phone industry. It will be appreciated that the present invention could apply in any such interactive communication environments; however, for purposes of discussion, the Web is used as an exemplary interactive hypertext environment with regard to the present invention.

A Web site is a server/computer connected to the Internet that has massive storage capabilities for storing hypertext documents and that runs administrative software for handling requests for those stored hypertext documents as well as dynamically generating hypertext documents. Embedded within a hypertext document are a number of hyperlinks, i.e., highlighted portions of text which link the document to another hypertext document possibly stored at a Web site elsewhere on the Internet. Each hyperlink is assigned a Uniform Resource Locator ("URL") that provides the name of the linked document on a server connected to the Internet. Thus, whenever a hypertext document is retrieved from any Web server, the document is considered retrieved from the World Wide Web. Known to those skilled in the art, a Web server may also include facilities for storing and transmitting application programs, such as application programs written in the JAVA® programming language from Sun Microsystems, for execution on a remote computer. Likewise, a Web server may also include facilities for executing scripts and other application programs on the Web server itself.

A remote access user may retrieve hypertext documents from the World Wide Web via a Web browser program. A Web browser, such as Netscape's NAVIGATOR® or Microsoft's Internet Explorer, is a software application program for providing a user interface to the WWW. Upon request from the remote access user via the Web browser, the Web browser requests the desired hypertext document from the appropriate Web server using the URL for the document and the HyperText Transport Protocol ("HTTP"). HTTP is a higher-level protocol than TCP/IP and is designed specifically for the requirements of the WWW. HTTP runs on top of TCP/IP to transfer hypertext documents and user-supplied form data between server and client computers. The WWW browser may also retrieve programs from the Web server, such as JAVA applets, for execution on the client computer. Finally, the WWW browser may include optional software components, called plug-ins that run specialized functionality within the browser.

Figure 2:
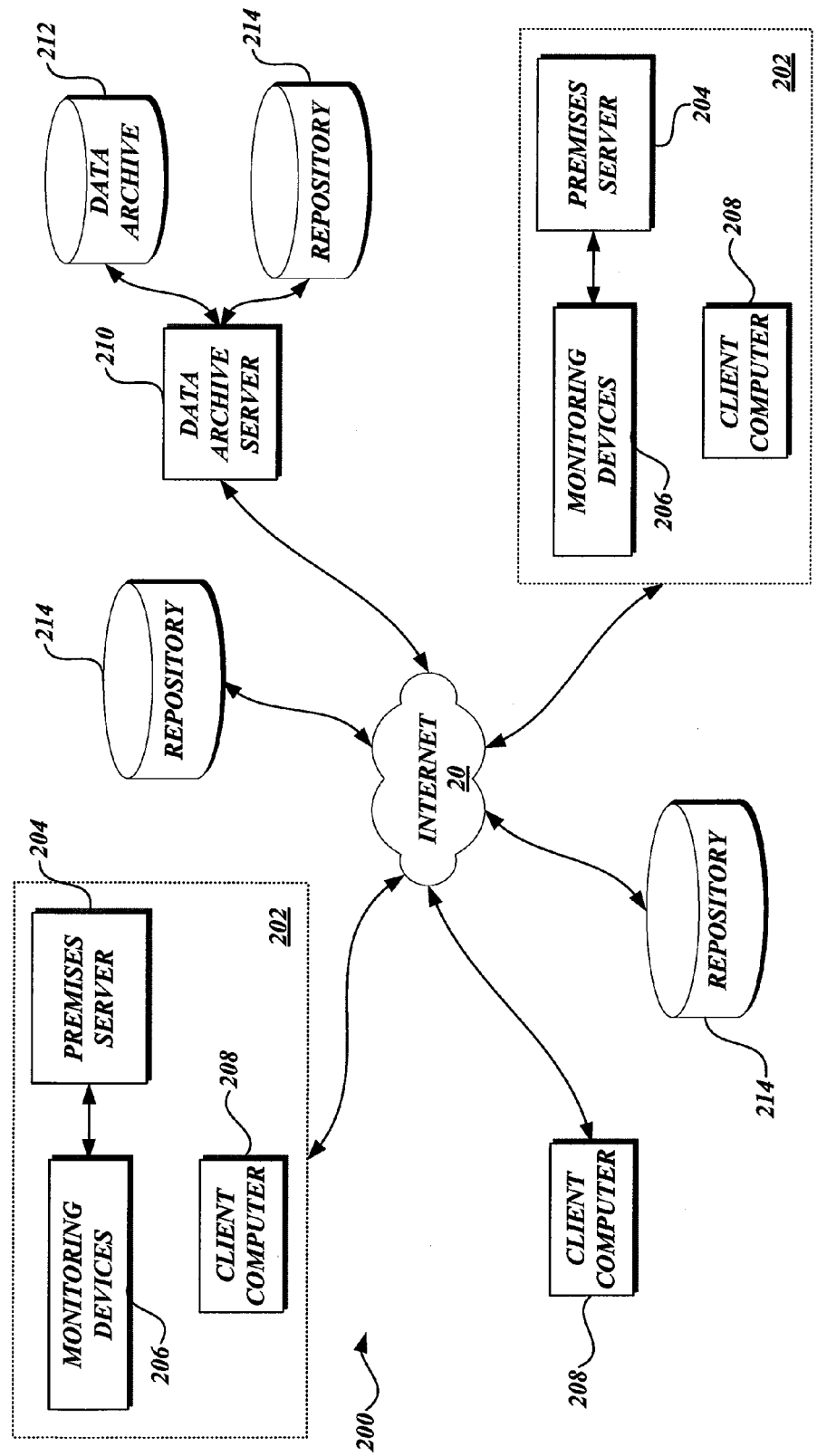
FIG. 2 is a block diagram of a data archiving system including a premises server, a plurality of client computers, a data archive server, and a plurality of data repositories formed in accordance with the present invention.

Referring now to FIG. 2, an actual embodiment of a data archive system 200 formed in accordance with the present invention will be described. In accordance with an illustrative embodiment of the present invention, the data archive system 200 facilitates the customization of data archival through the use of archive data profiles created by client computers and executed by a data archive server. More specifically, the archive data profiles of the present invention facilitate the specification of archival parameters, the extraction of data from data generating devices, the storage of extracted data in data repositories, the retrieval of archived data from the data repositories, and the management of archived data within the data repository. However, one skilled in the relevant art will appreciate that the below-described data archive system 200 is illustrative in nature and should not be construed as limiting. Moreover, one skilled in the relevant art will appreciate that some data archival systems formed in accordance with the present invention may omit one or more of the above-mentioned implementations of the data profiles of the present invention.

With reference now to FIG. 2, the data archive system 200 includes a number of premises 202, such as a building, an identifiable geographic location, or an identifiable logical location on a network, that generates data to be archived. In an illustrative embodiment of the present invention, the premises 202 includes a premises server 204 in communication with a number of monitoring devices 206 that generate device data. A more detailed description of a network for communicating with monitoring devices, including the use of one or more device servers, is found in co-pending U.S. application Ser. No. 10/117,557, entitled SYSTEM AND METHOD FOR MANAGING A DEVICE NETWORK and filed on Apr. 3, 2002, the disclosure of which is hereby incorporated by reference. Moreover, one skilled in the relevant art will appreciate some or all of the premises 202 within the data archive system 200 may omit the premises server 204.

In an illustrative embodiment of the present invention, the monitoring devices 206 can include one or more biometric identification devices, including, but not limited to, voice identification devices, image capture devices (e.g., video motion capture and still image capture), microphones, fingerprint identification devices, retinal identification devices, DNA identification devices, and the like. The monitoring devices 206 can also include smoke, fire, and carbon monoxide detectors. The monitoring devices 206 can further include door and window access detectors, glass break detectors, motion detectors, audio detectors, metal detectors, explosive detectors, and/or infrared detectors. Still further, the monitoring devices 206 may include pressure-sensitive mats or planar surfaces. Still further, the monitoring devices 206 can include conventional panic buttons, global positioning satellite ("GPS") locators, other geographic locators, medical indicators, and vehicle information systems. The monitoring devices 206 can also be integrated with other existing information systems, such as inventory control systems, accounting systems, reservation systems, point-of-sale terminals/systems, and the like. It will be apparent to one skilled in the relevant art that additional or alternative monitoring devices 206 corresponding to a specific monitoring function may be practiced with the present invention. Additionally, the device data can include binary, textual, graphical, and any combination thereof generated by a monitoring device 206. The device data can include raw data originating from a monitoring device 206 or data processed by the monitoring device 206 after it is captured, by the premises server 204, or any other computing device.

The data archive system 200 can also include one or more data archive servers 210 operable to obtain, execute, and manage archive data profiles in accordance with the present invention. In an illustrative embodiment of the present invention, the data archive server 210 may maintain a data archive profile database 212. Additionally, the data archive server 208 may also maintain data repositories 214 that are directly accessible to the archive server 208. Although only a single data archive server 208 is illustrated in FIG. 2, one skilled in the relevant art will appreciate that any number of data archive servers 208 may be utilized in accordance with the present invention, either as separate computing devices or in a distributed computing device embodiment.

With continued reference to FIG. 2, the data archive system 200 may also include a number of client computers 208 and/or data repositories 214 that are logically remote from a premises 202 and/or a data archive server 210. In an actual embodiment of the present invention, the various components of the data archive system 200 may communicate via a global communication network, such as Internet 20. Alternatively, some or all of the components may communicate via private or semi-private communication networks.

Figure 3:
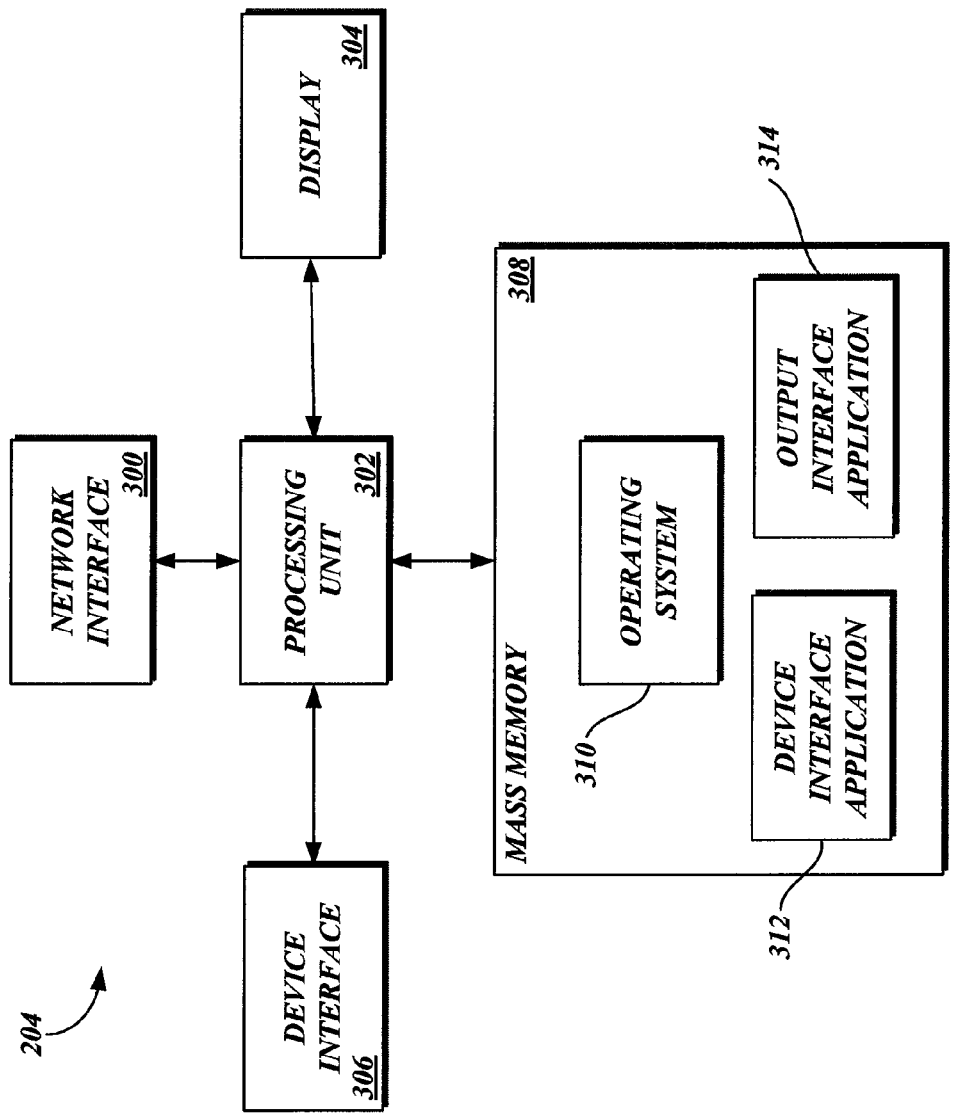
FIG. 3 is a block diagram of an illustrative architecture for a premises server having a device interface application and an output interface application in accordance with the present invention.

FIG. 3 is a block diagram depicting an illustrative architecture for a premises server 204 (FIG. 2). Those of ordinary skill in the art will appreciate that the premises server 204 includes many more components than those shown in FIG. 5. However, it is not necessary that all of these generally conventional components be shown in order to disclose an illustrative embodiment for practicing the present invention. As shown in FIG. 3, the premises server 204 includes a network interface 300 for connecting directly to a LAN or a WAN, or for connecting remotely to a LAN or WAN. Those of ordinary skill in the art will appreciate that the network includes the necessary circuitry for such a connection, and is also constructed for use with the TCP/IP protocol, the particular network configuration of the LAN or WAN it is connecting to, and a particular type of coupling medium. The premises server 204 may also be equipped with a modem for connecting to the Internet through a point-to-point protocol ("PPP") connection or a serial-line Internet protocol ("SLIP") connection as known to those skilled in the art.

The premises server 204 also includes a processing unit 302, an optional display 304, a device interface 306, and a mass memory 308, all connected via a communication bus, or other communication device. The device interface 306 includes hardware and software components that facilitate interaction with a variety of the monitoring devices via a variety of communication protocols including TCP/IP, X10, digital I/O, RS-232, RS-485, and the like. Additionally, the device interface 306 facilitates communication via a variety of communication mediums including telephone land lines, wireless networks (including cellular, digital, and radio networks), cable networks, and the like. In an actual embodiment of the present invention, the device interface 306 is implemented as a layer between the server hardware and software applications utilized to control the individual monitoring devices. It will be understood by one skilled in the relevant art that alternative interface configurations may be practiced with the present invention.

The mass memory 308 generally comprises a random access memory ("RAM"), a read only ("ROM"), and a permanent mass storage device, such as a hard disk drive, tape drive, optical drive, floppy disk drive, or combination thereof. The mass memory 308 stores an operating system 310 for controlling the operation of the premises server. It will be appreciated that this component may comprise a general-purpose server operating system as is known to those skilled in the art, such as UNIX, LINUX™, or Microsoft WINDOWS NT®. The memory also includes a WWW browser, such as Netscape's NAVIGATOR® or Microsoft's Internet Explorer browsers, for accessing the WWW.

The mass memory 308 also stores program code and data for interfacing with various monitoring devices 206 and for transmitting the monitoring device data. More specifically, the mass memory 308 stores a device interface application 312 in accordance with the present invention for obtaining monitoring device data from a variety of devices and for manipulating the data for processing. The device interface application 312 comprises computer-executable instructions which, when executed by the premises server 204, obtains and transmits device data as will be explained below in greater detail. The mass memory 308 also stores an output interface application program 314 for transmitting processed device data to one or more external system components. The operation of the output interface application 314 will be described in greater detail below. It will be appreciated that these components may be stored on a computer-readable medium and loaded into the memory of the premises server using a drive mechanism associated with the computer-readable medium, such as a floppy, CD-ROM, DVD-ROM drive, or network drive 300.

Figure 4:
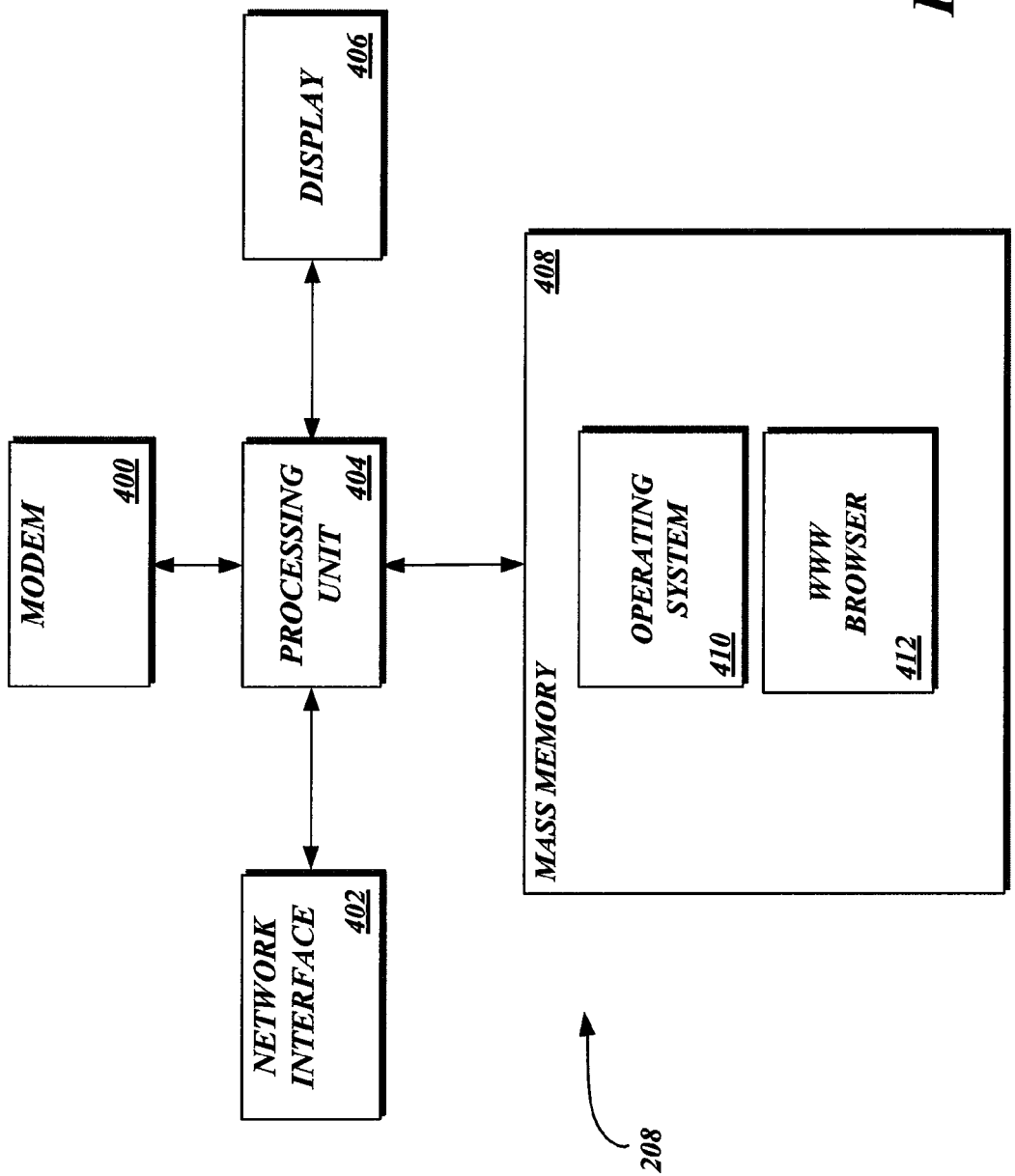
FIG. 4 is a block diagram of an illustrative architecture for a client computer having a browser application formed in accordance with the present invention.

FIG. 4 is a block diagram depicting an illustrative architecture for a client computer 208 (FIG. 2). Those of ordinary skill in the art will appreciate that the client computer includes many more components than those shown in FIG. 4. However, it is not necessary that all of these generally conventional components be shown in order to disclose an illustrative embodiment for practicing the present invention.

As shown in FIG. 4, the client computer 208 may include a modem 400 for connecting to an Internet service provider through a PPP or SLIP connection as known to those skilled in the art. The modem 400 may utilize a telephone link, cable link, wireless link, Digital Subscriber Line or other types of communication links known in the art. The client computer 208 may also include a network interface 402 for connecting directly to a LAN or a WAN, or for connecting remotely to a LAN or WAN. Those of ordinary skill in the art will appreciate that the modem 400, or network interface 402, includes the necessary circuitry for such a connection, and is also constructed for use with various communication protocols, such as the TCP/IP protocol, the Internet Inter-ORB Protocol ("IIOP"), X.25 and the like. The modem 400 may utilize the communication protocol of the particular network configuration of the LAN or WAN it is connecting to, and a particular type of coupling medium.

The client computer 208 also includes a processing unit 404, a display 406, and a memory 408. The memory 408 generally comprises a RAM, a ROM, and a permanent mass storage device, such as a hard disk drive, tape driver, optical drive, floppy disk drive, CD-ROM, DVD-ROM, or removable storage drive. The memory 408 stores an operating system 410 for controlling the operation of the client computer 208. The memory 408 also includes a WWW browser 412, such as Netscape's NAVIGATOR® or Microsoft's INTERNET EXPLORER® browser, for accessing other components of the data archive system 200 via the WWW.

It will be appreciated that these components may be stored on a computer-readable medium and loaded into memory 408 of the computing device using a drive mechanism associated with the computer-readable medium, such as a floppy disk drive, CD-ROM, DVD-ROM drive, or network interface 402.

The memory 408, display 406, network interface 402, modem 400 are all connected to the processor 404 via a bus. Other peripherals may also be connected to the processor in a similar manner. Additionally, one skilled in the relevant art will appreciate that the client computer 208 may be embodied in a variety of computing devices including desktop personal computers, server computers, hand-held computers, personal digital assistants, mobile communication devices, and the like. Still further, the client computer 208 may be embodied as a stand-alone computing device, or may be emulated in a general purpose-computing device having several functions.

Figure 5:
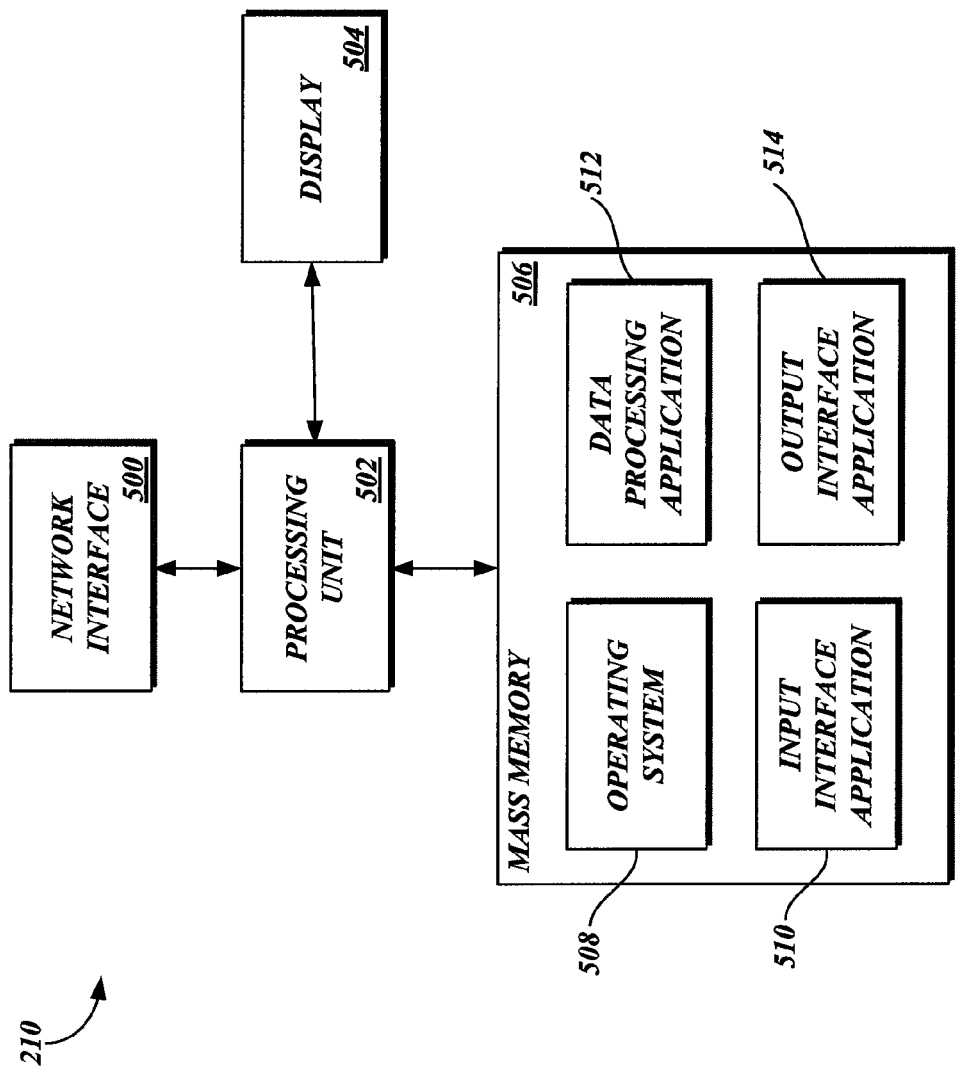
FIG. 5 is a block diagram of an illustrative architecture for a data archive server having an input interface application, a data processing application, and an output interface application formed in accordance with the present invention.

FIG. 5 is a block diagram depicting an illustrative architecture for a data archive server 210 (FIG. 2). Those of ordinary skill in the art will appreciate that the data archive server 210 includes many more components then those shown in FIG. 5. However, it is not necessary that all of these generally conventional components be shown in order to disclose an illustrative embodiment for practicing the present invention.

As shown in FIG. 6, the data archive server 210 includes a network interface 500 for connecting directly to a LAN or a WAN, or for connecting remotely to a LAN or WAN. Those of ordinary skill in the art will appreciate that the network interface 500 includes the necessary circuitry for such a connection, and is also constructed for use with the TCP/IP protocol, the particular network configuration of the LAN or WAN it is connecting to, and a particular type of coupling medium. The data archive server 210 may also be equipped with a modem for connecting to the Internet 20.

The data archive server 210 also includes a processing unit 502, an optional display 504, and a mass memory 506, all connected via a communication bus, or other communication device. The mass memory 506 generally comprises a RAM, ROM, and a permanent mass storage device, such as a hard disk drive, tape drive, optical drive, floppy disk drive, or combination thereof. The mass memory 506 stores an operating system 508 for controlling the operation of the central server. It will be appreciated that this component may comprise a general-purpose server operating system.

The mass memory 506 also stores program code and data for interfacing with the premises devices and data repositories to accept incoming and archived data, for processing the device data, and for outputting data for archiving and responsive to archive data requests. More specifically, the mass memory 506 stores an input interface application 510 in accordance with the present invention for obtaining data from a variety of monitoring devices 206 and for communicating with various data repositories 214. The input interface application 510 comprises computer-executable instructions which, when executed by the data archive server 210, interfaces with the premises server 204 and data repositories 214 as will be explained below in greater detail. The mass memory 506 also stores a data processing application 512 for obtaining archive data profiles, for processing monitoring device data in accordance with archive data profiles, and for processing archive data requests. The operation of the data processing application 512 will be described in greater detail below. The mass memory 506 further stores an output interface application 514 for outputting monitoring device data to a specified data repository 214. The output interface application 514 is further operable to output archived data in response to a request from a client computer 208. The operation of the output interface application 514 will be described in greater detail below. It will be appreciated that these components may be stored on a computer-readable medium and loaded into the memory of the central server using a drive mechanism associated with the computer-readable medium.

Generally described, the present invention facilitates the collection, archiving and maintenance of data. In an illustrative embodiment of the present invention, a user, through a client computer 208, generates archive profiles that specify various archival parameters. The archive profiles are stored and executed by the data archive server 210 to collect monitoring device data and forward the data to a designated data repository 214. The archive profiles can further be utilized to process client computer 208 requests for archived data. Additionally, the archive profiles can be utilized to maintain the archived data in the data repositories 214.

Figure 6A:
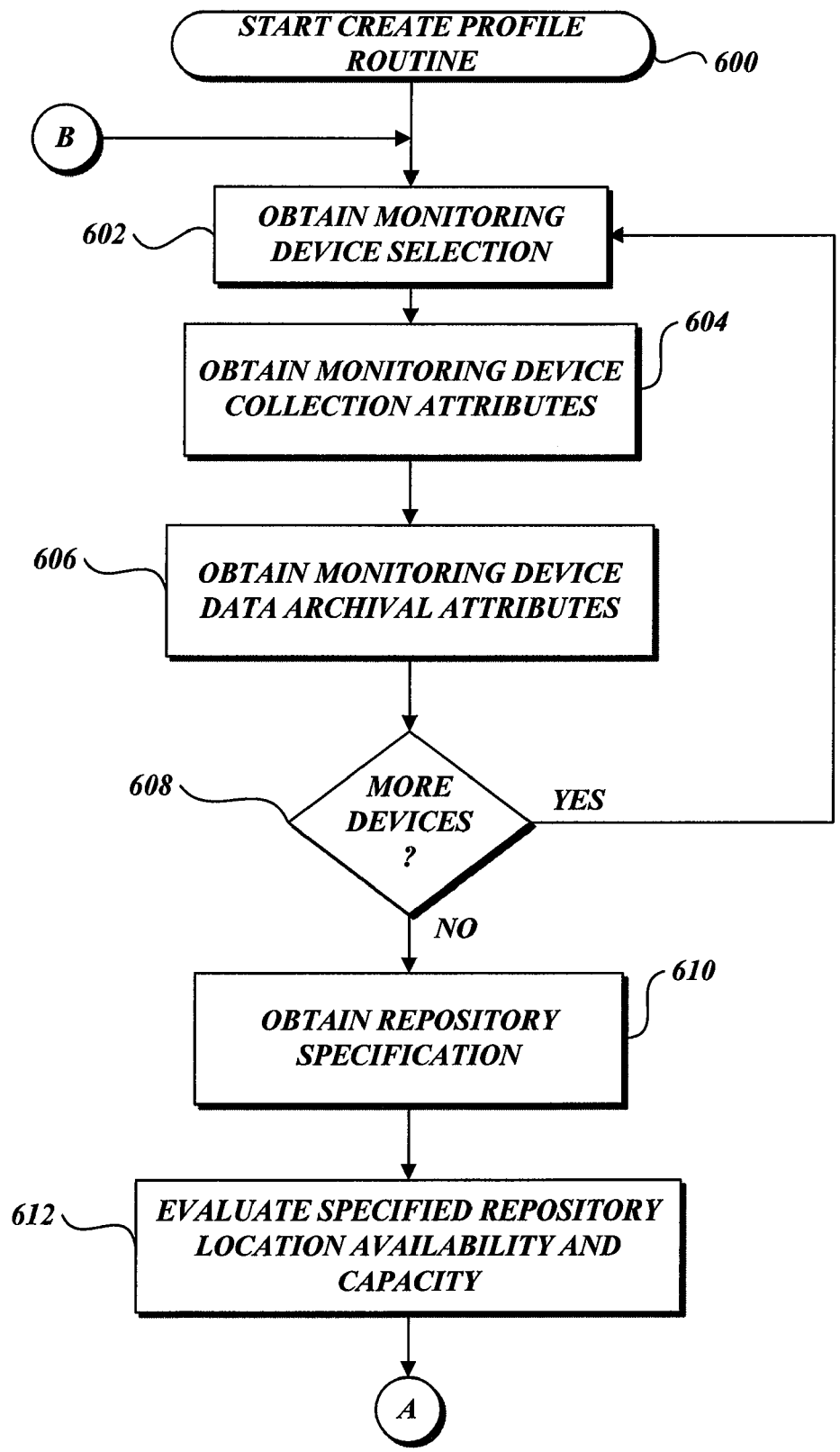
FIGS. 6A and 6B are flow diagrams illustrative of an archive data profile creation routine implemented by a data archive server in accordance with the present invention.
Figure 6B:
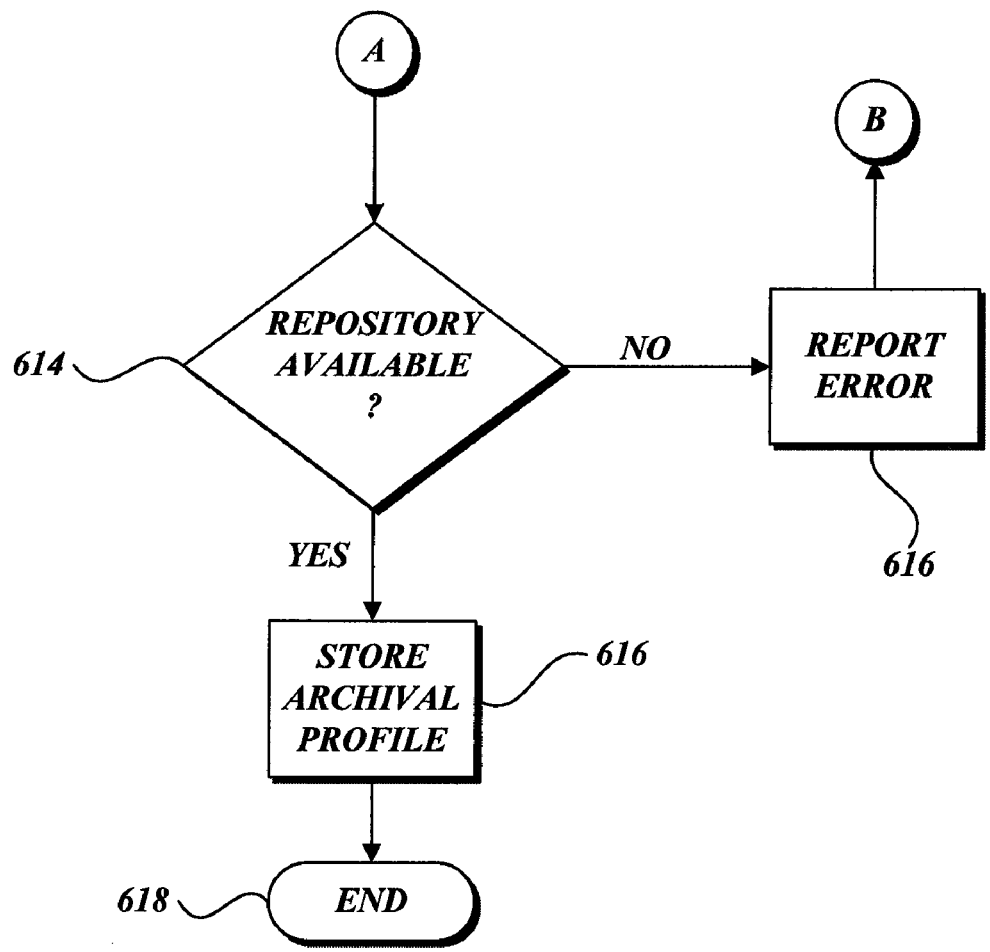

With reference now to FIGS. 6A and 6B, a routine 600 for the creation of archive data profiles will be described. With reference to FIG. 6A, at block 602, the input interface application 510 of the data archive server 210 obtains a selection of a monitoring device 206 corresponding to the data to be archived. In an illustrative embodiment of the present invention, the data archive server 210 may provide one or more graphical user interfaces that can be generated by the WWW browser 412 of the client computer 208. The graphical user interface may provide users with a list of available monitoring devices such that a user can manipulate the graphical user interface to select a particular monitoring device 206 or group of devices. The graphical user interface may also provide additional forms of security authorization to determine whether a particular user has adequate authority to generate and/or modify an archive profile.

At block 604, the input interface application 510 obtains monitoring device collection attributes. In an illustrative embodiment of the present invention, the monitoring device collection attributes can include time relation attributes, such as the days of the week or time periods within a day to collect data. Monitoring device collection attributes can also include conditional attributes that establish thresholds for archiving data. For example, a condition attribute may dictate that data from a particular premises should be collected upon the detection of motion. Other monitoring device collection attributes can include a specification that any data generated by a particular monitoring device, such as a computer usage network, should be archived. One skilled in the relevant art will appreciate that other collection attributes may be specified.

At block 606, the input interface application 510 obtains monitoring device data archival attributes. In an illustrative embodiment of the present invention, the data archival profile can include a specification for collecting monitoring device data prior to being archived. In one aspect, the data archival profile may include a time specific specification. For example, the data archival profile may dictate that a specific monitoring device data be archived once every week. In another aspect, the data archival profile may include a threshold specific specification. For example, the data archival profile may dictate that a certain minimum amount of data, 1 Megabyte of data, should be collected prior to being archived. One skilled in the relevant art will appreciate that other collection specifications may be specified.

In an actual embodiment of the present invention, additional archival data may be collected during the creation of the archival profile. In one aspect, the input interface application 510 may collect archival data retention data. In another aspect, the input interface application 510 may collect archival retrieval data such as security authorization data. In still another aspect, the input interface application 510 may collect archival data display information utilized by the output interface application 514 to transmit archived data. One skilled in the relevant art will appreciate that the data archive profile may include any combination of data and may include additional or alternative data.

At decision block 608, a test is conducted to determine whether any additional monitoring devices are to be included the archive profile. In an illustrative embodiment of the present invention, a single data archive may correspond to multiple monitoring devices. Additionally, in one embodiment, a data archive may be more data specific and apply to a group of monitoring devices 206, or all the monitoring devices in the data archive system 200. If additional monitoring devices are selected, the routine 600 returns to block 602. Alternatively, the routine 600 proceeds to block 610.

At block 610, the input interface application 510 obtains a specification of specific data repository 214 to archive the data. In an illustrative embodiment of the present invention, the repository may be selected by manipulating the graphical user interface. In one embodiment, each data repository 214 provided to the user may be illustrated as a "virtual" repository such that all the possible repositories may be represented as being in a central facility. In another embodiment of the present invention, the graphical user interface may only highlight data repositories 214 that are capable of accepting the archive data. Additionally, one or more data repositories may be specified as a default repository. At block 612, the data processing application 512 evaluates whether the specified repository 214 is available and has sufficient capacity to handle the data archives. In an illustrative embodiment of the present invention, the evaluation of the selection may be based on an estimated amount of data to be collected. Alternatively, the evaluation may be based on whether the repository has a threshold amount of available storage space. In one embodiment, segments of data may be archived in two or more specified repositories 214 according to the archive profile to provide selective replication of archived data.

With reference to FIG. 6B, at decision block 614, a test is conducted to determine whether the selected repository is available. If the selected repository is not available, an error is reported at block 616 and the routine 600 returns to block 602 (FIG. 6A). Alternatively, the routine 600 may return to block 610 for a specification of another repository 214 after the reporting of an error at block 616. If the repository is available, at block 616, the archive data profile is stored in the data archive database 212. In an illustrative embodiment of the present invention, the output interface application 514 may generate a summary of the data archive via a Web page. At block 620, the routine 600 terminates.

Figure 7:
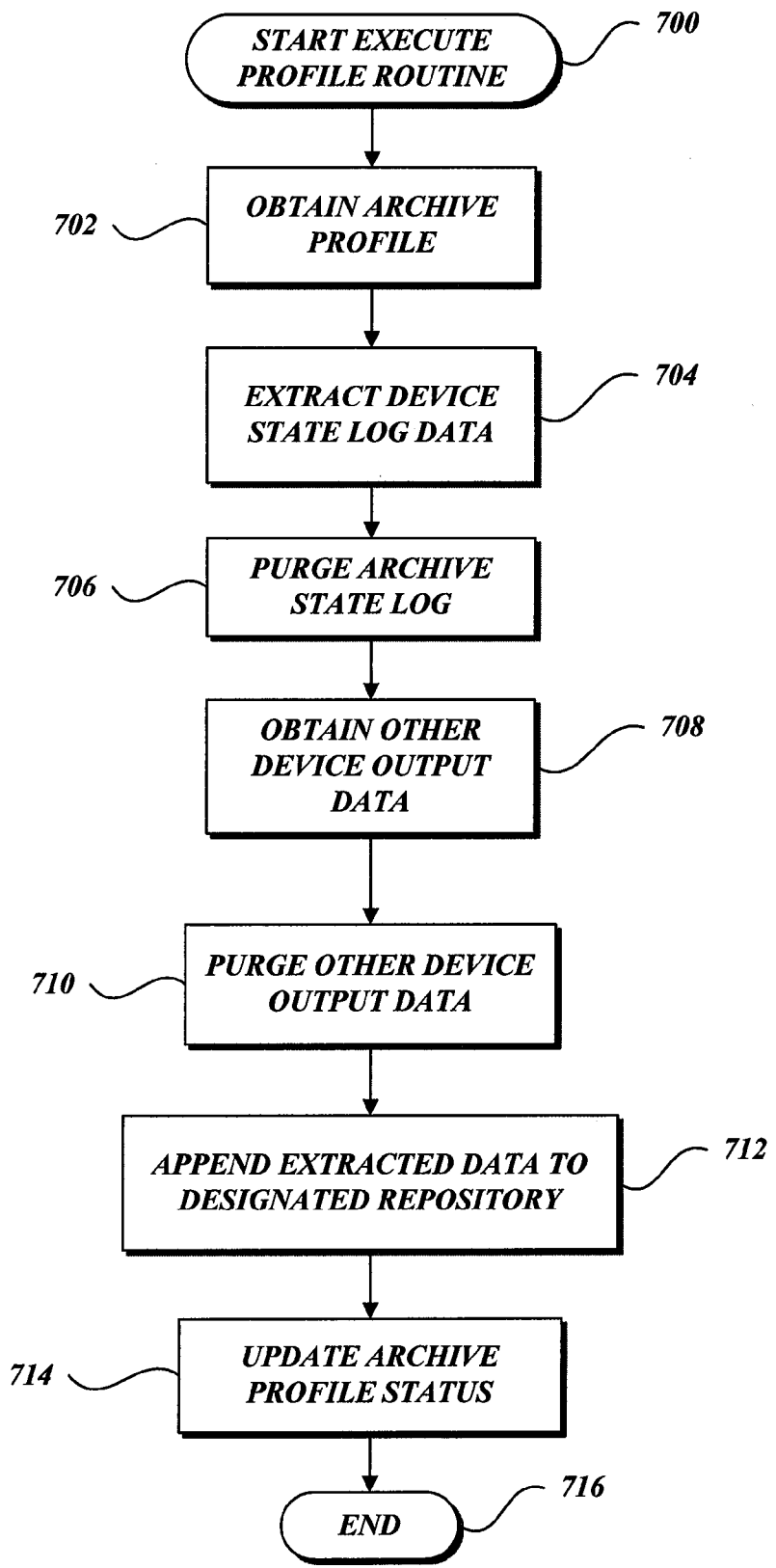
FIG. 7 is a flow diagram illustrative of an archive data profile execution routine implemented by a data archive server in accordance with the present invention.

With reference now to FIG. 7, a routine 700 for executing a data archive profile for incoming monitoring device data will be explained. At block 702, a data archive profile corresponding to the incoming monitoring device data is obtained. In an illustrative embodiment of the present invention, the data processing application 512 may obtain data archive profiles that correspond to specific monitoring devices or that correspond to different types of incoming data. For example, the data processing application may maintain one or more tables for correlating specific data archive profiles to different types of data, data from specific monitoring devices, data coming in from a specific time, and the like. At block 704, the input interface application 510 extracts device state log data from the monitoring device 204. In an illustrative embodiment of the present invention, monitoring device data can include log data indicating the status of the monitoring device such as on, off, standby, and the time of data. Additionally, the log data can include data indicating textual data indicating levels of sensors, values recorded (user identification numbers), and the like. At block 706, the archive log state is purged from the monitoring device 204. At block 708, the input interface application 510 obtains other device data from the monitoring devices. In an illustrative embodiment of the present invention, other device data can include video images, audio images, and the like. At block 710, the other device data is purged from the monitoring device 204.

At block 712, the state log data and other device data is appended to the designated repository 214. In an illustrative embodiment of the present invention, the data processing application 512 may process the extracted data according to the data archive profile prior to the output interface application 514 forwarding the data to the designated data repository 214. In an exemplary embodiment of the present invention, data to be archived is converted to extensible markup language ("XML") prior to storage. As is known to those skilled in the art, conversion to XML format enables the data to be retrieved or displayed by other applications. In an actual embodiment, values are extracted from a data record and flattened (changed from two-dimensional table record into one-dimensional text). These flat-files are converted to XML and archived. In one embodiment, the data processing application 512 may filter the data according to the data archive profile to selectively process the data being transferred to the repository. Additionally the data processing application 512 may further process the data, such as through a data normalization or compression process for long term storage in the data repository 214. In an illustrative embodiment, data is compressed using a ZIP compression format and converted to a ZIP file prior to storage in a database. In a still further embodiment, the data to be forwarded to the designated repository includes authentication data, which may include the addition of data (as in a watermark) or a checksum value to verify contents. At block 714, the data archive profile is updated. In an illustrative embodiment of the present invention, the update can include log data and the whether the archival was successful. At block 716, the routine 700 terminates.

Figure 8:
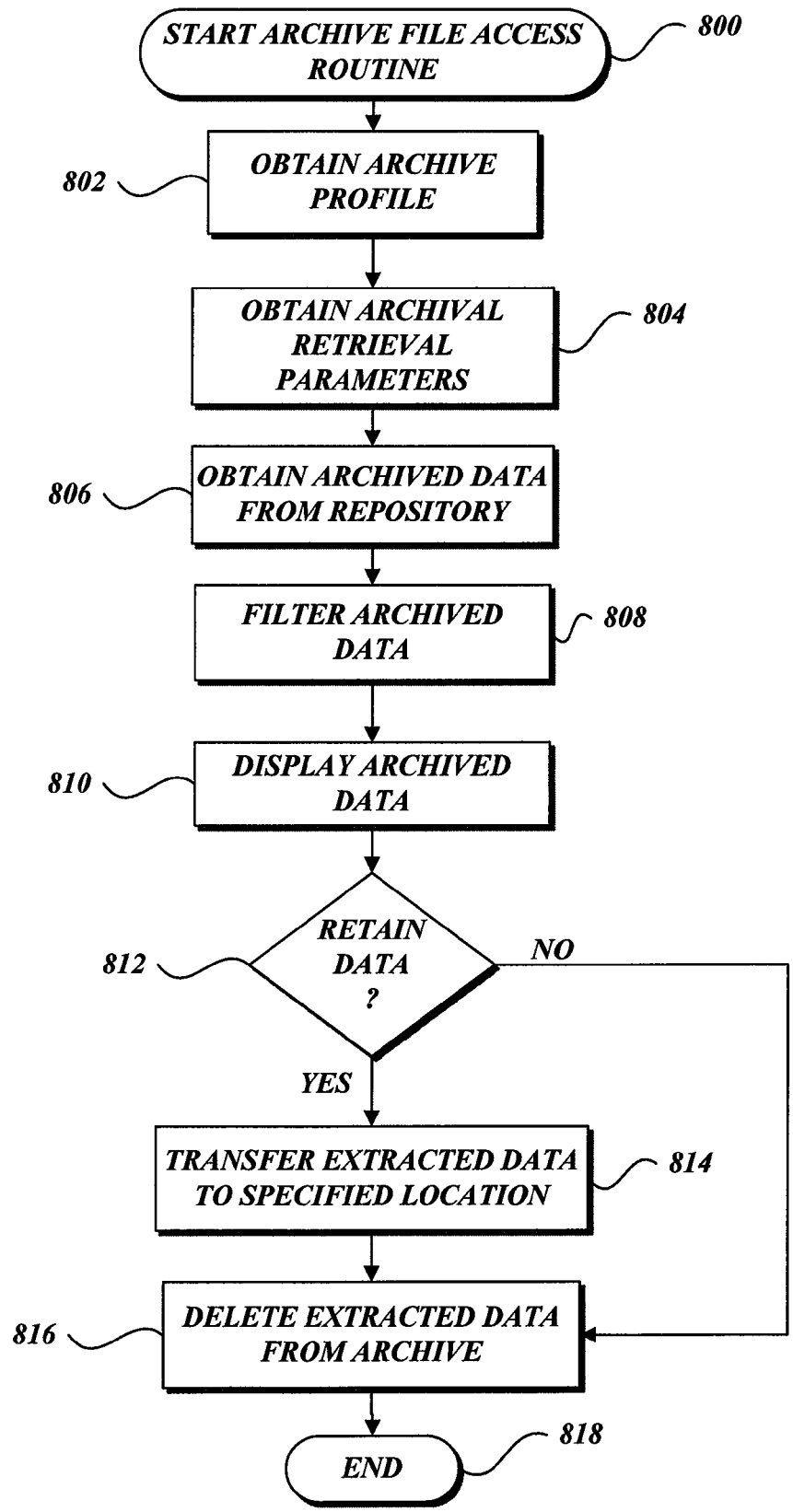
FIG. 8 is a flow diagram illustrative of an archive data retrieval routine implemented by a data archive server in accordance with the present invention.

With reference now to FIG. 8, an archive file access routine 800 implemented by the data archive server 210 will be explained. At block 802, an archive data profile is obtained. In an illustrative embodiment of the present invention, a client computer 208 may request archival data. The data processing application 512 may obtain archive profiles that correspond to the type of data being requested and the monitoring device 206 that generated the data. At block 804, the data processing application 512 obtains the data archival parameters specified in the archive data profile.

At block 806, the input interface application 510 obtains the archived data from the designated data repository 214. In an illustrative embodiment of the present invention, the data processing application 512 may have to process the archived data, which may have been encrypted or compressed for ease of storage. At block 808, the data processing application 512 filters the archived data. In one embodiment, the data processing application 512 filters the archived data according to one or more criteria specified in the request for archived data. In another embodiment, the data processing application 512 filters the archived data according to one or more criteria specified in the data archive profile. For example, the data archive profile may specify security requirements for viewing the data. In another example, the data archived may also be processed according to criteria specified in the data archive profile. For example, the data may be processed such that it is designated as read only. In a still further example, the checksum is applied to the archived data to authenticate contents.

At block 810, the output interface application 514 outputs the archived data to be displayed to the user at the client computer 208. In one embodiment of the present invention, the data may be displayed to the user as a series of static hypertext markup language ("HTML") Web pages. For example, textual archived data may be display as individual lines within a page. Each line may represent an individual entry from the monitoring device 206. Graphical or audio data may also be represented on the static HTML pages as hyperlinks that link the user to the file. In another embodiment of the present invention, the data may be displayed to the user as a stream of audio, video, and textual data. In this embodiment, the client computer 208 may display a moving stream of textual and non-textual data. The user can be presented with traditional control buttons on the user interface that can control the speed and direction of the stream. The stream can be paused, repeated, and stopped to allow the data to be processed.

At decision block 812, a test is conducted to determine whether the retrieved archive data should be retained. If the data should not be retained, the routine 800 terminates at block 818. If the data is to be retained, at block 814, the output interface application 514 transfers the extracted data to a location specified in the request. For example, the data may be transferred to a storage media, such as a local hard drive, print media, network data file, and the like, as designated by the client computer 208. At block 816, the data processing application 814 deletes the retrieved data from the data repository 204. One skilled in the relevant art will appreciate that the deletion may be omitted. At block 818, the routine 800 terminates.

Figure 9:
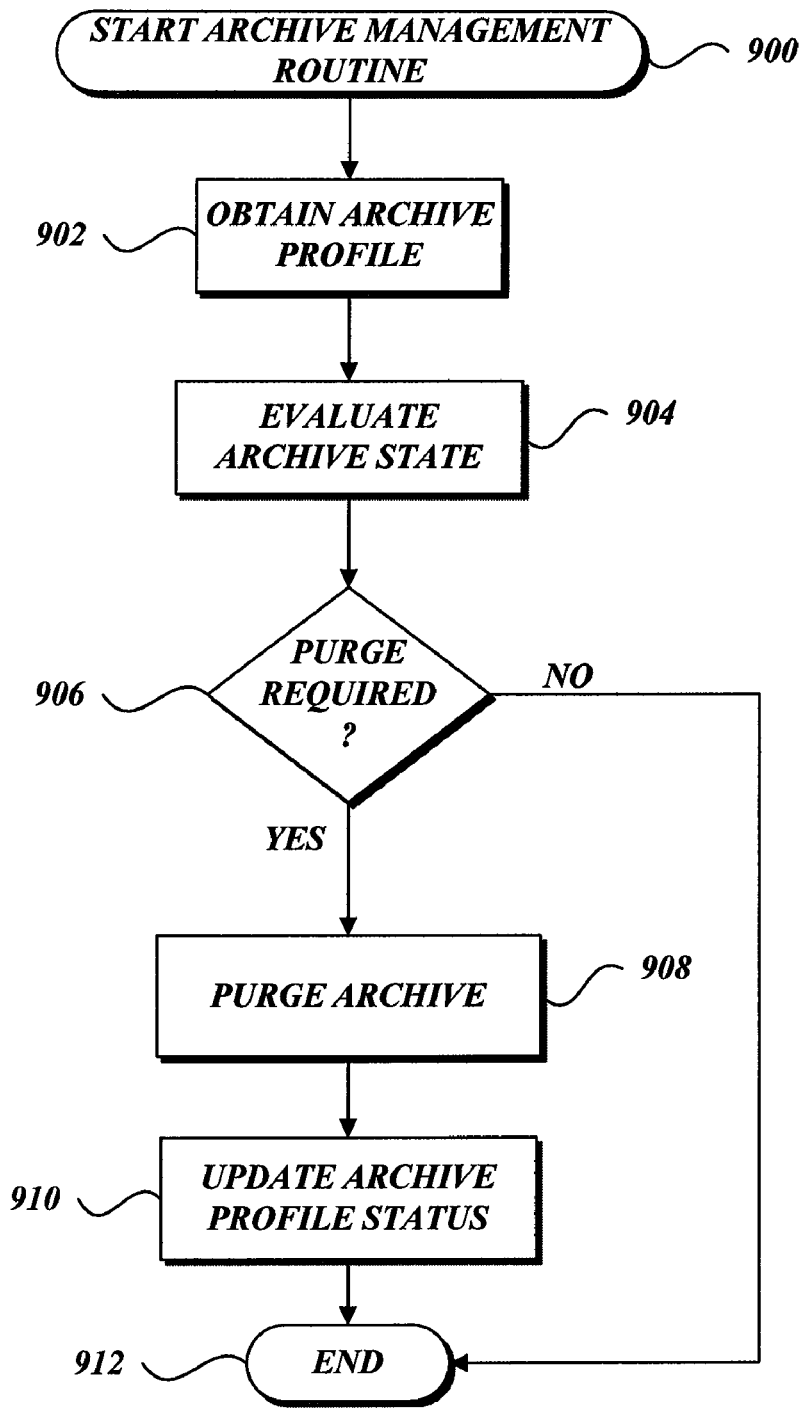
FIG. 9 is a flow diagram illustrative of a data archive management routine implemented by a data archive server in accordance with the present invention.

With reference now to FIG. 9, a routine 900 implemented by the data archive server 210 for archival management will be described. At block 902, the input interface application 512 obtains an archival profile. In an illustrative embodiment of the present invention, the archival profiles may be selected that correspond to a particular data repository 214. For example, the data processing application 512 may select a data repository after the expiration of a given period of time. Alternatively, the selection of the archival profile may correspond to a particular data type or a particular monitoring device 206. At block 904, the data processing application 512 evaluates the archive status. In an illustrative embodiment of the present invention, the evaluation of the archive status can include a timing aspect dictating a time period in which to purge archived data. In one embodiment, after a designated time period has elapsed, archived data may be systematically "thinned." In an illustrative embodiment, after thirty days of storage, archived video data may be thinned at a rate of an exemplary one frames per second. After an additional time period or periods, additional frames of data may be thinned until a desired base level of archival is reached, which may result in the purging of all data or the retention of a minimum amount of data. In another embodiment, the evaluation of the archive status can include a memory usage aspect dictating a threshold amount of memory in which to purge archived data. One skilled in the relevant art will appreciate that additional or alternative aspects may also be included in the evaluation of the archive status.

At decision block 906, a test is conducted to determine whether a purge is required. If a purge is not required, the routine 900 proceeds to block 912, where the routine 900 terminates. If a purge is required, at block 908, the data processing application 512 purges the data archive. At block 910, the data processing application 512 updates the archive profile corresponding to the purged archived data. At block 912, the routine 900 terminates. In an alternative embodiment of the present invention, the output interface application 514 may output reports indicating the results of the management routine 900.

While illustrative embodiments have been illustrated and described, it will be appreciated that various changes can be made therein without departing from the spirit and scope of the invention.

The embodiments of the invention in which an exclusive property or privilege is claimed are defined as follows:

1. A system for processing monitoring device data, the system comprising:
    one or more monitoring devices generating monitoring device data characterized by one or more data archival attributes;
    a monitoring device data processor for obtaining an archival profile corresponding to the one or more data archival attributes and for processing the monitoring device data according to the archival profile; and
    at least one data repository for storing the monitoring device data according to the archival profile,
    wherein the monitoring device data processor determines whether the archival profile is associated with one or more archival attributes of the monitoring device data, and
    wherein, if the archival profile is associated with one or more archival attributes, the monitoring device data processor:
        processes the monitoring device data having one or more archival attributes that match the archived profile into a compressed format, and
        selectively stores the monitoring device data in the compressed format on the at least one data repository.

2. The system as recited in claim 1, wherein the archival profile corresponds to a type of incoming monitoring device data archival attribute.

3. The system as recited in claim 1, wherein the archival profile corresponds to a user archival attribute.

4. The system as recited in claim 1, wherein the archival profile corresponds to an event archival attribute.

5. The system as recited in claim 1, wherein the monitoring device data includes device state information and device information and wherein the monitoring device data processor processes the device state information according to a device state portion of the archival profile and processes the device information according to a device information portion of the archival profile.

6. The system as recited in claim 5, wherein the device state information includes data selected from a group consisting of a status of a monitoring device, a time of day, value for one or more sensors associated with the monitoring device, a premises identifier, and a user identifier.

7. The system as recited in claim 5, wherein the device information can include both video and audio data.

8. The system as recited in claim 1, wherein the monitoring device data processor further performs processing on the incoming monitoring device data, the processing performed including one selected from the group of normalizing, compressing, and transforming the incoming monitoring device data.

9. The system as recited in claim 1, further comprising multiple data repositories and wherein the monitoring device data processor selectively replicates at least a portion of the incoming monitoring device data in at least two data repositories.

10. The system as recited in claim 1 further comprising at least one client machine requesting archived data, wherein the monitoring device data processor further obtains an archival profile corresponding to the archived data, processes the archival profile to retrieve archived data from a repository, returns the archived data according to the data request.

11. The system as recited in claim 1, wherein the monitoring device data processor obtains archival retrieval parameters from the archival profile and determines whether the archival request satisfies the archival retrieval parameters.

12. The system as recited in claim 1, wherein the monitoring device data processor further uncompresses the archived data.

13. The system as recited in claim 1, wherein the monitoring device data processor further obtains an archival component for each data repository and manages the archived data within each repository according the archival profile.

14. The system as recited in claim 13, wherein the monitoring device data processor further deletes a portion of the archived data on a per time basis.

15. The system as recited in claim 13, wherein the archived data is video frame data and wherein the monitoring device data processor further deletes a number of frames of the archived data over a period of time.

16. The system as recited in claim 13, wherein the monitoring device data processor further purges archived data from each data repository.

17. A computer-readable medium having computer-executable instructions for selectively archiving monitoring device data based on an archival profile, the instructions performing a method of:
    obtaining incoming monitoring device data, wherein the incoming monitoring device data is characterized by one or more archival attributes;
    obtaining an archival profile for selectively archiving the incoming monitoring device data;
    determining whether the archival profile is associated with one or more archival attributes of the incoming monitoring device data;
    if the archival profile is associated with one or more archival attributes:
        processing the incoming monitoring device data having one or more archival attributes that match the archived profile into a compressed format; and
        selectively storing the incoming monitoring device data in the compressed format on a storage medium.

18. The computer-readable medium as recited in claim 17, wherein the monitoring device data includes device state information and wherein processing the incoming monitoring device data includes processing the device state information according to a device state portion of the archival profile.

19. The computer-readable medium as recited in claim 18, wherein the device state information can include data selected from a group consisting of a status of a monitoring device, a time of day, value for one or more sensors associated with the monitoring device, a premises identifier, and a user identifier.

20. The computer-readable medium as recited in claim 17, further comprising:
    obtaining a request for retrieval of archived data;
    obtaining an archival profile corresponding to the archived data;
    processing the archival profile to retrieve archived data from a repository; and returning the archived data according to the data request.

* * * * *